United States Patent
Bradley et al.

(10) Patent No.: US 8,086,387 B2
(45) Date of Patent: Dec. 27, 2011

(54) SYSTEM AND METHOD OF FUEL SYSTEM OPTIMIZATION

(75) Inventors: Marty K. Bradley, Los Alamitos, CA (US); Mark C. Kay, Florissant, MO (US)

(73) Assignee: The Boeing Company, Chicago, IL (US)

( * ) Notice: Subject to any disclaimer, the term of this patent is extended or adjusted under 35 U.S.C. 154(b) by 927 days.

(21) Appl. No.: 12/141,770

(22) Filed: Jun. 18, 2008

(65) Prior Publication Data

US 2009/0319153 A1 Dec. 24, 2009

(51) Int. Cl.
*F02D 41/00* (2006.01)
(52) U.S. Cl. ........................................ 701/103
(58) Field of Classification Search .......... 701/103–105, 701/102, 115
See application file for complete search history.

(56) References Cited

U.S. PATENT DOCUMENTS

| | | |
|---|---|---|
| 4,545,020 A | 10/1985 | Brasfield |
| 5,121,732 A | 6/1992 | Benninger et al. |
| 5,569,922 A * | 10/1996 | Clarke .................. 250/339.12 |
| 7,328,132 B2 | 2/2008 | Lang |
| 7,352,464 B2 | 4/2008 | Chen et al. |
| 7,673,613 B2 * | 3/2010 | Yamashita .................. 123/399 |
| 2006/0163483 A1 | 7/2006 | Chabanis et al. |

FOREIGN PATENT DOCUMENTS

| | | | |
|---|---|---|---|
| JP | 2005-326258 A | * | 11/2005 |
| JP | 2009-13889 A | * | 7/2007 |
| JP | 2009-174400 A | * | 8/2009 |

OTHER PUBLICATIONS

David L. Daggett, et al., Alternate Fuels for Use in Commercial Aircraft, http://www.boeing.com/commercial/environment/pdf/alt_fuels.pdf; 2007.

* cited by examiner

*Primary Examiner* — Hieu T Vo
(74) *Attorney, Agent, or Firm* — Armstrong Teasdale LLP

(57) ABSTRACT

A method of optimizing a fuel system on a vehicle is provided. The fuel system includes a fuel tank configured to receive and contain a quantity of fuel, and the method includes determining a property associated with the quantity of fuel contained within the fuel system, comparing the determined property with a nominal value for that fuel property, and modifying at least one vehicle sub-system setting in response to the determined fuel property.

20 Claims, 3 Drawing Sheets

SYSTEM AND METHOD OF FUEL SYSTEM OPTIMIZATION

BACKGROUND OF THE DISCLOSURE

The field of the invention relates generally to gas turbine engine fuel systems and more specifically to the optimization of such fuel systems dependent upon the type of fuel being used in the system.

The various jet fuel types are governed by standards developed by the American Society for Testing and Materials (ASTM). These standards set specification constraints for the quality of aviation turbine fuels and describes the fuels found satisfactory for the operation of aircraft and turbine engines. To be utilized for aviation, each jet fuel type must meet or exceed the standards for aviation fuels. Current gas turbine engine and commercial aircraft research and development efforts are focusing on the practicality of using alternative fuels in near-term, mid-term, and far-term aircraft. However, most known alternative fuels do not comply with the ASTM established standards, and many are non-compliant outside of the established specifications by 2-20%. To bring such fuels into compliance, significant processing steps may need to be taken to convert such fuels into the allowable specification range. Such additional processing steps may render the alternative fuels financially impractical.

Current efforts are underway to certify "drop in" jet fuels as alternatives to typical aircraft fuels, such as Jet-A, for example. A "drop in" fuel, i.e. direct replacement, is a fuel that is capable of being blended with, or completely replacing Jet-A fuel without necessitating any substantial modifications to the aircraft or engine. Some known "drop in" fuels, which consist primarily of a blend of kerosene and other synthetic fuels, are currently available for use in existing and near-term aircraft.

However, future mid-term and long-term aircraft development projects propose using a wide variety of bio-jet and synthetic fuels (as blends and in unmixed or "neat" form) for use in ultra-efficient airplane designs. Such fuels are substantially similar in performance to conventional jet fuel, but may have a near-zero sulfur and aromatics content resulting in substantially lower particulate exhaust emissions. In addition, synthetic fuels exhibit excellent low-temperature properties, maintaining a low viscosity at lower ambient temperatures.

As mentioned above, many alternative fuels have properties that do not fit within current ASTM fuel specifications, or that vary within specification limits and have different relationships between properties. Such fuels may be considered "near drop-in" fuels, as their usage would require only minor system adjustments to aircraft systems to allow for safe and efficient use. Some known methods of optimizing fuel systems in response to these differing fuel properties include conducting a major ground and flight test program to obtain approval of each alternative fuel or fuel combination. Additionally, alternative fuels may be heavily processed to attempt to meet all or nearly all fuel specification limits, which can add significant cost to the fuel. Currently, there is no reliable way to quickly determine the type of fuel being used in the aircraft in combination with adjusting aircraft and engine systems to use "near drop-in" fuels. Such a method would add flexibility to aviation fuel specifications, and enable a wider variety of alternative fuels to be utilized in military and commercial aircraft. The above-mentioned flexibility could broaden options for a more environmentally friendly aviation fuel supply, reduce fuel cost, improve fuel quality assurance, and provide a more robust supply if conventional fuel supplies are disrupted.

BRIEF DESCRIPTION OF THE DISCLOSURE

One aspect is directed to a method of optimizing a fuel system on a vehicle. The fuel system includes a fuel tank configured to receive and contain a quantity of fuel, and the method includes determining a property of the quantity of fuel within the fuel system, comparing the determined property with a nominal value for the fuel property, and modifying the vehicle in response to the determined fuel property.

Another aspect is directed to a computer readable medium that includes a process to be executed by a processor for use in optimizing a fuel system on a vehicle. The vehicle includes a fuel tank configured to receive and contain a quantity of fuel, and the processor, when executing said process, is programmed to determine a property of the quantity of fuel within the fuel system, compare the determined property with a nominal value for the fuel property, and modify the vehicle in response to the determined fuel property.

Another aspect is directed to an alternative fuel-powered vehicle that includes a mission planning system configured to determine a range of the vehicle, a fuel system comprising at least one sensor. The fuel system is optimized by a computer system that is programmed to determine a property of a fuel within the fuel system, compare the determined property with a nominal value for the fuel property, and modify the fuel gaging system and mission planning system in response to the determined fuel property.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION

Figure 1:
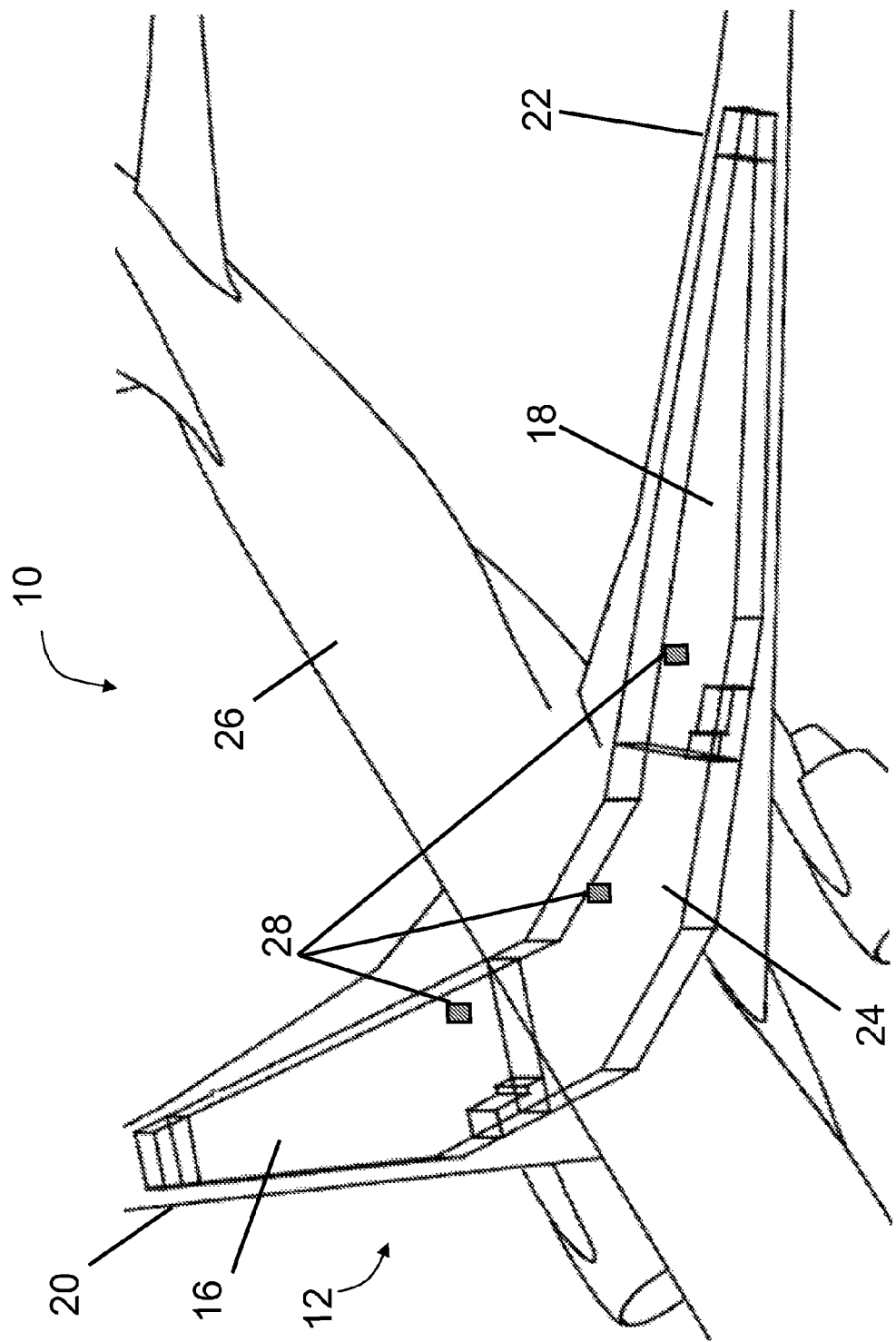
FIG. 1 is an internal perspective view of an exemplary aircraft fuel system.
Figure 2:
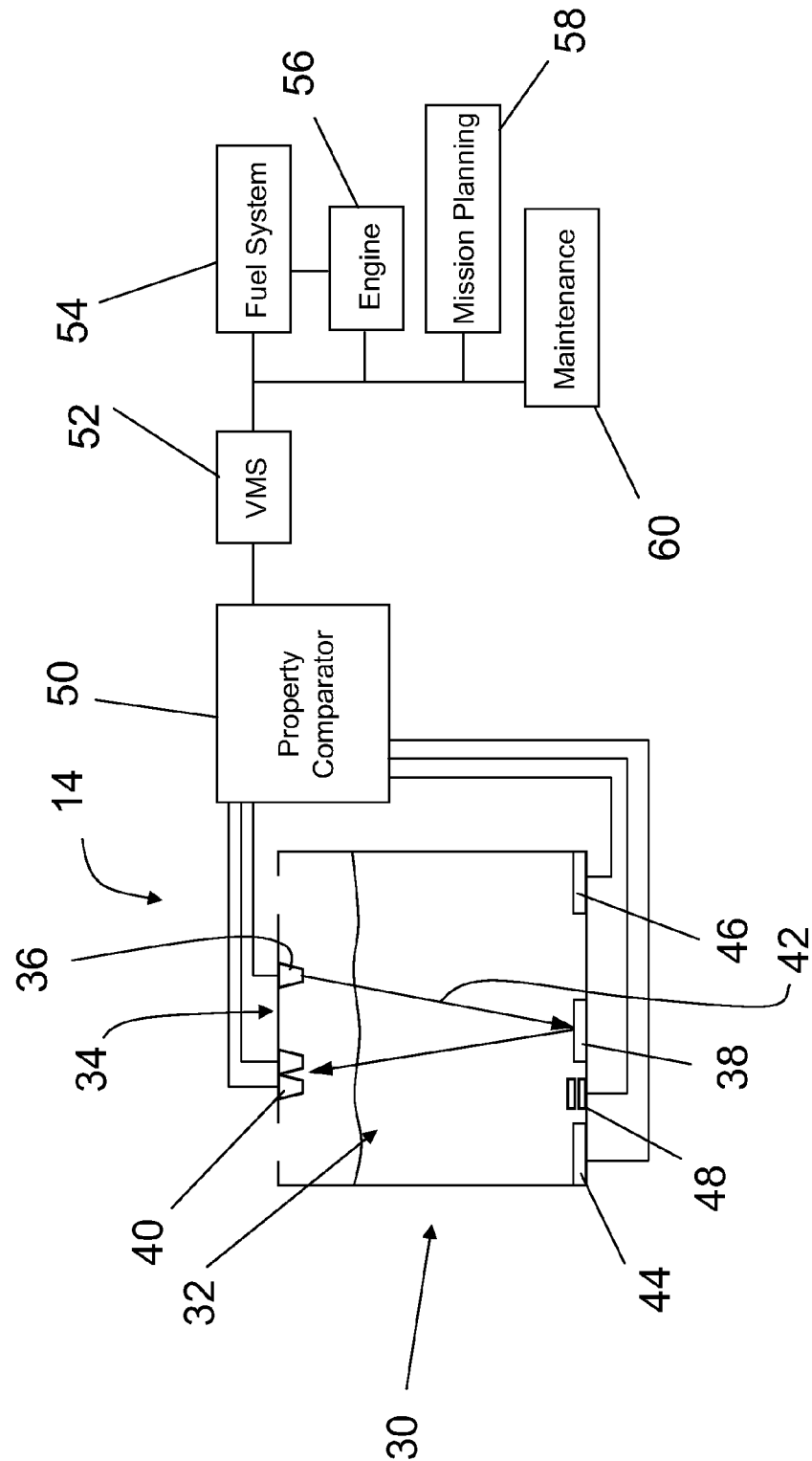
FIG. 2 is a schematic illustration of an exemplary optimizer assembly that may be used in the aircraft fuel system shown in FIG. 1.

Referring to FIGS. 1 and 2, FIG. 1 is an internal perspective view of an aircraft 10 with exemplary aircraft fuel system 12, and FIG. 2 is a schematic illustration of an exemplary optimizer assembly 14 that may be used in aircraft fuel system 12 shown in FIG. 1. Aircraft fuel system 12 includes a first fuel tank 16 and a second fuel tank 18 positioned proximate a respective wing 20, 22 of aircraft 10, and a center fuel tank 24 positioned within an aircraft fuselage 26. Alternatively, aircraft 10 may have any fuel tank configuration to allow aircraft 10 to function as described herein. In the exemplary embodiment, first fuel tank 16, second fuel tank 18 and center fuel tank 24 each include a sensor assembly 28 for use in determining the fuel type contained in each tank and to facilitate optimizing fuel system 12 using data regarding determined the fuel type, as described in more detail herein.

As shown in FIG. 2, and in the exemplary embodiment, a fuel tank 30 contains a quantity of fuel 32, and a known optical sensor assembly 34 that includes a source 36, a mirror 38 and a sensor element 40 arranged in sequence such that a light 42 emitted from source 36 is directed by the mirror 38 towards sensor 40. Sensor element 40 measures a physical variable of light 42 emitted through the quantity of fuel 32, for example water content of the fuel 32. Fuel tank 30 also includes a thermometer 44, a densitometer 46 and a fixed capacitor 48 that measure temperature, density and dielectric constant respectively. Specifically, fixed capacitor 48 measures the dielectric constant of the fuel 32 by measuring the capacitance of the fuel. Since capacitance is a function of the dielectric constant and the geometry of the fixed capacitor, the fuel dielectric constant can be calculated. Each of the sensor element 40, thermometer 44, densitometer 46 and a fixed capacitor 48 are in communication with a property comparator 50 positioned within aircraft 10 that receives the measurements from each of the sensor element 40, thermometer 44, densitometer 46 and fixed capacitor 48. Property comparator 50 is programmed for determination of further fuel properties such as, for example, fuel acidity, fuel aromatics content, fuel flash point, fuel freeze point, fuel viscosity and fuel heat of combustion. Property comparator 50 is also programmed to compare the received measured properties with pre-determined nominal values for the measured properties and resolve the type of fuel contained in the fuel system. A Vehicle Management System (VMS) 52 positioned within aircraft 10 is in communication with property communicator 50. Based upon the determined fuel type contained in the system, VMS 52 determines aircraft subsystem adjustments that must be made to accommodate the fuel type, as described in more detail herein. The determined subsystem adjustments are then communicated to the various aircraft sub-systems, such as a fuel system 54, an engine 56, a mission planning system 58 and maintenance system 60.

Figure 3:
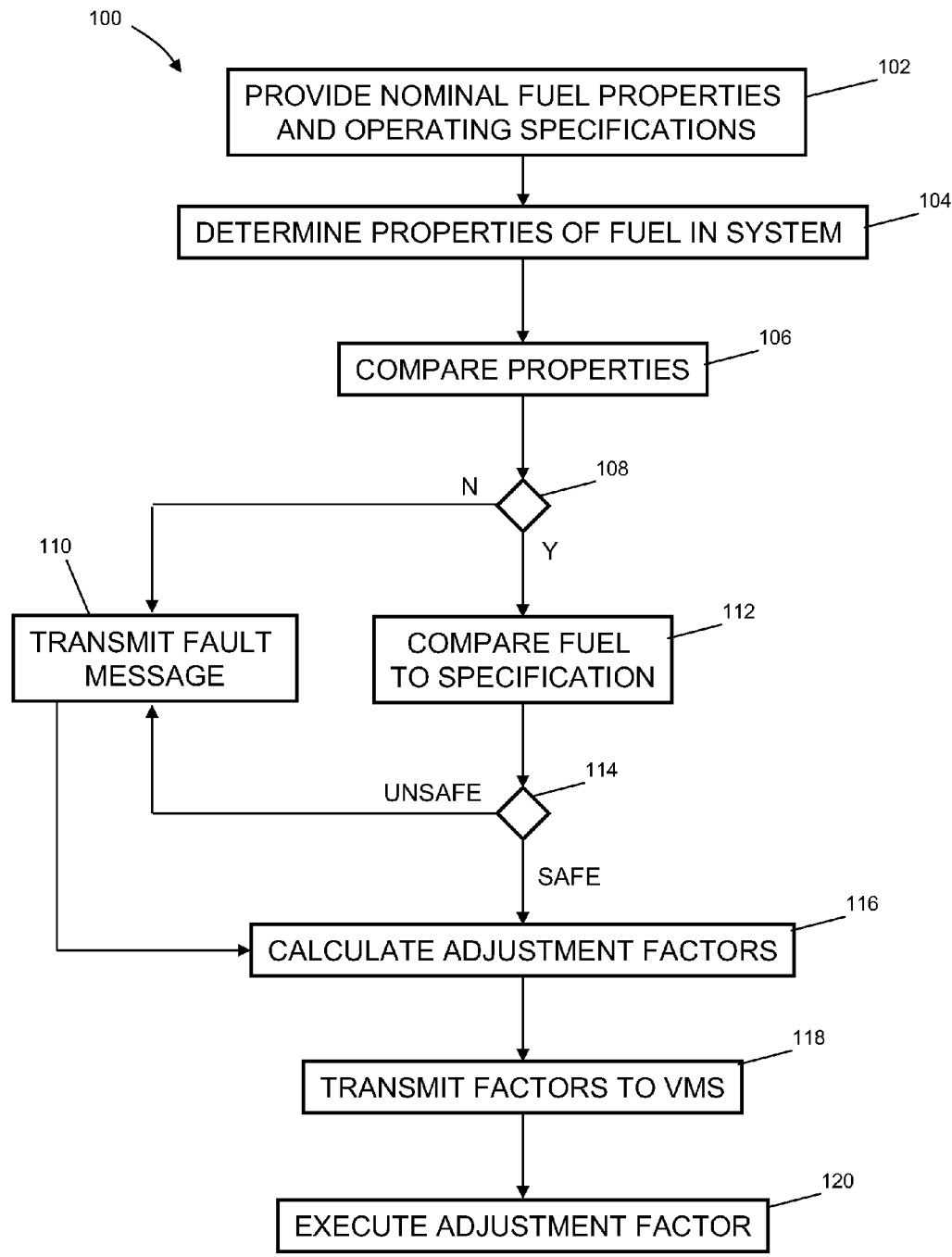
FIG. 3 is a flow diagram of an exemplary method of optimization that may be used in the aircraft fuel system shown in FIG. 1.

FIG. 3 is a flow diagram 100 of an exemplary method for fuel optimization that may be used in aircraft fuel system 12 shown in FIG. 2. In the exemplary embodiment, nominal fuel properties are provided 102 to the property comparator 50 (shown in FIG. 2) from a database of standard fuel properties for conventional aviation fuels, synthetic and biofuels, and any blend combination of these known fuels. In the exemplary embodiment, the provided standard fuel properties include fuel acidity, fuel aromatics content, fuel flash point, fuel density, fuel freeze point, fuel viscosity, fuel heat of combustion, fuel conductivity, fuel water content, and dielectric. Alternatively, any property may be provided that enables the fuel type to be determined as described herein. Additionally, fuel operating specifications are provided 102 to the property comparator 50 (shown in FIG. 2). In the exemplary embodiment, engine specification values are provided in ASTM D1655 (Jet A, Jet A-1) and MIL-DTL-83133E (JP-8).

Fuel properties associated with the fuel contained in the aircraft fuel system 12 are then determined 104 by the property comparator 50 (shown in FIG. 2). In the exemplary embodiment, an optical sensor assembly and various other property measurement devices, i.e. a thermometer, a densitometer and a fixed capacitor, are included within the fuel tank (as shown in FIG. 2). In the exemplary embodiment, fuel density, fuel conductivity, water content and a dielectric constant are measured using the sensor assembly and the included measurement devices. Specifically, the optical sensor assembly operates to determine fuel water content, and a thermometer 44, a densitometer 46 and a fixed capacitor 48 measure temperature, density and dielectric constant respectively. From these measurements, the type of fuel provided in the aircraft fuel tank can be determined 104. Alternatively, any fuel property may be measured therewith to enable the type of fuel provided in the fuel tank to be determined 104 such as, for example, fuel acidity, fuel aromatics content, fuel flash point, fuel freeze point, fuel viscosity and fuel heat of combustion. In another embodiment, the type of sensor is not limited to the following, but may be for example, an infrared sensor or a laser sensor, or any other sensor that enables the fuel type to be determined as described herein.

The determined 104 fuel properties are then compared 106 with the provided 102 nominal fuel properties. The property comparator 50 (shown in FIG. 2) determines the most likely fuel type using the determined and provided data, and determines whether the results of the comparison 106 are expected 108. If the determined fuel type is not expected, a fault signal is transmitted 110 externally wherein the fault signal is subsequently displayed and used to alert ground crew personnel, or a pilot, that the fuel type is not expected. If the determined fuel type is expected, the determined fuel properties are then compared 112 to a fuel specification for engine operation. In the exemplary embodiment, engine specification values are provided in ASTM D1655 (Jet A, Jet A-1) and MIL-DTL-83133E (JP-8). If the determined fuel property values are determined 114 to be unsafe following comparison 112, a fault signal is transmitted 110 externally where the fault signal is displayed, thus alerting ground crew personnel, or a pilot, that the fuel type is not expected.

If the determined fuel property values are determined 114 to be safe following comparison 112, aircraft system adjustment factors are then calculated 116 using the comparisons 112 between the determined fuel properties and the specifications. Fuel-dependent aircraft sub-systems must then be adjusted to account for differences in the determined fuel properties. In the exemplary embodiment, the aircraft fuel system, mission planning system, and engine operational settings will be modified. Specifically, the property comparator with calculate 116 adjustment factors for these systems based upon the comparisons 106, 112, and these calculated system adjustments are transmitted 118 to the VMS for dissemination to the various aircraft systems and sub-systems.

In the exemplary embodiment, the aircraft systems and/or sub-systems autonomously execute the adjustments to ensure the aircraft fuel system is optimized and operating within safe and efficient parameters depending upon the determined fuel type in the system.

Further, although the present invention is described with respect to processors and computer programs, as will be appreciated by one of ordinary skill in the art, the present invention may also apply to any system and/or program that is configured to optimize gas turbine engine fuel system performance and efficiency for a range of conventional, synthetic and bio-fuels, or any fuel-blend combination. For example, as used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as; a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

Exemplary embodiments of optimization techniques for use in aircraft fuel systems are described in detail above. The above-described fuel systems that include a system for automatically measuring fuel characteristics in the fuel tank to determine fuel properties, compare these properties to acceptable limits, and signal these properties to the fuel gaging system and engines to allow adjustment to optimize performance, enhance safety and efficiency for a range of conventional, synthetic, and biofuels and any blend combination. Moreover, this system is particularly useful for sensing key fuel properties while the fuel is in the fuel tank, rather then requiring outside laboratory testing. The system described herein would allow the use of a much wider range of "near drop-in" alternative fuels that currently can not be accommodated, as well as determining how the aircraft and engine parameters need to be changed to safely and efficiently accommodate the alternative fuel, and would allow a determination to be made whether the fuel is within specifications and safe to fly.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle capable of utilizing multiple fuel types, said vehicle comprising;
    a mission planning system configured to determine a range of the vehicle;
    a fuel system comprising at least one sensor, said fuel system communicatively coupled to a computer system that is programmed to:
        determine a property associated with the quantity of fuel contained within the fuel system based on received data;
        compare the determined property with a nominal value for that fuel property; and
        modify the fuel gauging system and mission planning system in response to the determined fuel property.

2. A vehicle in accordance with claim 1 wherein said sensor includes at least one of an optical sensor, a laser sensor and an infrared sensor, said sensor positioned within the fuel tank and configured to collect data associated with the quantity of fuel contained within the fuel system including at least one of a fuel acidity, a fuel aromatics content, a fuel flash point, a fuel density, a fuel freeze point, a fuel viscosity, a fuel heat of combustion, a fuel conductivity, a fuel water content, and a dielectric.

3. A vehicle in accordance with claim 2 wherein said computer system is further programmed to recalibrate a fuel quality indicator using the measured fuel density.

4. A vehicle in accordance with claim 2 wherein said computer system is further programmed to apply an adjustment factor using the measured fuel property to said mission planning system to modify a vehicle range.

5. A vehicle in accordance with claim 1 wherein said computer system is further programmed to determine a fuel type from a known list of fuels types using the determined fuel property.

6. A vehicle in accordance with claim 1 wherein the computer system is further programmed to output a signal to a user, wherein the signal comprises at least one of a safe signal and a fault signal using the comparison.

7. A computer readable medium comprising a process to be executed by a processor for use in optimizing a fuel system on a vehicle including a fuel tank configured to receive and contain a quantity of fuel, said processor, when executing said process, is programmed to:
    determine a property associated with the quantity of fuel contained within the fuel system;
    compare the determined property with a nominal value for that fuel property; and
    modify at least one vehicle sub-system setting based on the determined fuel property.

8. A computer readable medium in accordance with claim 7 wherein said processor, when executing said process, is further programmed to determine a fuel type from a known list of fuels types using the determined fuel property.

9. A computer readable medium in accordance with claim 7 wherein said processor, when executing said process, is further programmed to receiving data associated with the quantity of fuel contained within the fuel system from a sensor positioned within the fuel tank, wherein the sensor includes at least one of an optical sensor, a laser sensor and an infrared sensor.

10. A computer readable medium in accordance with claim 9 wherein the sensor is configured to make measurements associated with at least one of a fuel acidity, a fuel aromatics content, a fuel flash point, a fuel density, a fuel freeze point, a fuel viscosity, a fuel heat of combustion, a fuel conductivity, a fuel water content, and a dielectric.

11. A computer readable medium in accordance with claim 10 wherein said processor, when executing said process, is further programmed to recalibrate a fuel quality indicator using the measured fuel density.

12. A computer readable medium in accordance with claim 10 wherein said processor, when executing said process, is further programmed to apply an adjustment factor using the measured fuel property to modify a vehicle range.

13. A computer readable medium in accordance with claim 7 wherein said processor, when executing said process, is further programmed to output a signal to a user, wherein the signal comprises at least one of a safe signal and a fault signal using the comparison.

14. A method of optimizing a fuel system on a vehicle, the fuel system including a fuel tank configured to receive and contain a quantity of fuel, said method comprising:
- determining a property associated with the quantity of fuel contained within the fuel system;
- comparing the determined property with a nominal value for that fuel property; and
- modifying at least one vehicle sub-system setting based on the determined fuel property.

15. A method in accordance with claim 14 further comprising determining a fuel type from a known list of fuels types using the determined fuel property.

16. A method in accordance with claim 14 wherein determining a property of the fuel further comprises receiving data associated with the quantity of fuel contained within the fuel system from a sensor positioned within the fuel tank, wherein the sensor includes at least one of an optical sensor, a laser sensor and an infrared sensor.

17. A method in accordance with claim 16 wherein the sensor is configured to provide data relating to the fuel property including at least one of a fuel acidity, a fuel aromatics content, a fuel flash point, a fuel density, a fuel freeze point, a fuel viscosity, a fuel heat of combustion, a fuel conductivity, a fuel water content, and a dielectric.

18. A method in accordance with claim 17 wherein modifying at least one vehicle sub-system further comprises recalibrating a fuel quality indicator using the measured fuel density.

19. A method in accordance with claim 17 wherein modifying the vehicle further comprises applying an adjustment factor using the measured fuel property to modify a vehicle range.

20. A method in accordance with claim 14 further comprising outputting a signal to a user, wherein the signal comprises at least one of a safe signal and a fault signal using the comparison.

* * * * *